United States Patent [19]

Dold

[11] 4,249,745
[45] Feb. 10, 1981

[54] RECORDING APPARATUS

[75] Inventor: Berthold Dold, Schramberg, Fed. Rep. of Germany

[73] Assignee: Kienzle Apparate GmbH, Villingen, Fed. Rep. of Germany

[21] Appl. No.: 21,694

[22] Filed: Mar. 19, 1979

[30] Foreign Application Priority Data

Mar. 31, 1978 [DE] Fed. Rep. of Germany ....... 2813849

[51] Int. Cl.³ .............................................. G11B 17/06
[52] U.S. Cl. ..................................... 369/219; 369/78; 369/245
[58] Field of Search ................................ 274/13, 23 R

[56] References Cited

U.S. PATENT DOCUMENTS 3,414,271  12/1968  Eisemann ..................... 274/23 R X Primary Examiner—Charles E. Phillips
Attorney, Agent, or Firm—Toren, McGeady and Stanger

[57] ABSTRACT

A recording device featuring simplicity of design operative with a movable planar recording medium is formed as a unitary lever assembly having a first arm with a stylus mounted thereon and a second arm actuated to effect rotation of the lever assembly about a mounting axle to effect recording operation. The mounting of the lever assembly on the axle includes a rectangular slot which permits tilting movement of the lever assembly laterally of the mounting axle to permit the stylus to be lifted from the recording medium.

12 Claims, 4 Drawing Figures

RECORDING APPARATUS

BACKGROUND OF THE INVENTION

The present invention relates generally to recording devices and more particularly to a recording arrangement wherein a recording means may be mounted in a very simple manner within an overall arrangement which is designed to emphasize simplicity. More specifically, the invention relates to the type of apparatus wherein a stylus mounted at the end of a recording lever cooperates with a recording medium and is moved transversely to the direction of movement of the recording medium while also exhibiting the capacity for being lifted from the recording means.

In recording devices such as that to which the present invention relates, it is important that the apparatus be capable of allowing exchange or replacement of the recording medium without damage thereto. For example, when the recording medium is to be exchanged, it must be capable of accomplishment without scratching the recording medium and without damage to the stylus. The capacity for avoiding damage to the recording medium and to the recording apparatus is especially important in devices where it is not possible to move the recording medium away from the recording device as is the case, for example, in tachographs where the recording medium is mounted in a tiltable lid. In such arrangements, it is especially important that a recording apparatus exhibiting good design features be provided in order not only to provide desirable operating characteristics but also to avoid expensive construction.

If it is desired to provide a mounting for a recording apparatus involving a relatively simple design, it will be found that two principal solutions will arise. In one such solution, a mounting axis is arranged in a plane parallel to the plane of the recording medium. In the other solution, the axis is arranged in a plane normal or perpendicular to the plane of the recording medium.

Within the aforementioned limits, a design in accordance with the prior art wherein a slide exclusively guided in one dimension, that is, in a direction transverse to the transport direction of the recording medium, is of such a nature that it cannot be given extensive consideration. Such a slide is of the type tiltably mounting a recording means which is lowered to or lifted from the recording medium, by electromagnetic means.

In the first solution mentioned, the recording movement is achieved by axially moving the recording means which is mounted by means of a suitable bearing mechanism on an axle while the recording point or stylus is lifted from the record medium by rotation of the recording means around the axis.

Such a mounting arrangement for a recording device is advantageous insofar as relatively large recording movements are possible with a linear movement of the recording point and as several recording means may be mounted on the same axle when they are staggered in a suitable manner.

However, such a staggered arrangement is often difficult to achieve from a practical viewpoint since the ranges of recording will overlap each other or be very close to each other. Also, for reasons of design, and in order to achieve better utilization of available space, different mounting arrangements are preferable, especially in cases where several recording devices for small recording movements must be arranged adjacent each other. It is of decisive disadvantage, however, where the mounting part for the recording means must be axially moved during recording since bearing means must be of a very high quality. In order to avoid slanting of the bearing means due to forces influencing the recording means, it becomes also necessary to arrange the bearing means not only at a relatively far distance from each other but also to make them free of tolerance variations. This gives rise to high cost in production and also to high frictional loads which must be taken into consideration with regard to the drive means for the recording device.

In comparison with devices of the type described above, there would arise fewer driving problems in an arrangement where the recording means is capable of being rotated or tilted around its axle in order to lift the recording point off the recording medium, inasmuch as this action is normally effected by manual operation, for instance by opening the lid of the apparatus or when a lock or the like is actuated. Simultaneously, of course, with respect to the tilting movement of the recording means, there will arise more favorable conditions with regard to the friction which is developed than with respect to the recording drive so that such an arrangement of the mounting means would be a serious error with respect to prevailing driving conditions.

With respect to such an adaptation, other possible arrangements of the mounting means for the recording means by functionally reversing the parts is considered to be advantageous when arc-shaped recording lines may be accepted or when the recording movement is relatively small. This is all the more applicable with regard to desired relative simplicity in design and mounting arrangement for recording means where a straightline motion mechanism or the like is not an acceptable choice because of its high expense.

A problem which arises from such a mounting arrangement of a recording device relates to the manner which must be utilized for lifting the recording point or stylus off the record medium. In known recording arrangements, this has been solved in that the axle for mounting the recording means is mounted on a carrier rotatably connected to the recording device. In another solution, the recording means is mounted to be axially displaceable on the axle.

With regard to the aforementioned first solution, consideration must be given to the fact that it is only of limited use with a view to the recording tolerances to be expected. In many cases it may also not be realized for reasons of design. The second solution is functionally, and from a design viewpoint, relatively simple. However, it requires a relatively large amount of space since the recording lever and, therefore, the entire recording means must be lifted off the record carrier parallel thereto when there is sufficient distance between the recording point and the record carrier. Also, in this case, it is difficult to avoid slanting so that by a corresponding design it must be avoided that a tilting movement is produced transversely to the axis when the recording means is lifted off.

In this connection it is also known to lift the recording means off the recording medium only a short distance and thereafter to rotate its axis so that it is no longer over the recording medium. The main disadvantage of this solution relates to its space requirements so that the use of several recording means is limited or rendered impossible within the individual recording apparatus.

Of course, the recording device according to the previously mentioned slide arrangement may be mounted on a carrier which is in itself rotatably mounted on an axis normal to the recording plane and which is in a suitable driving connection with the recording driving means. This solution is mentioned in this connection only to provide a complete consideration of the available alternatives but not to indicate that it is considered a solution which would allow achievement of the desired objective. Here, the recording means is mounted on an axle which is fastened to carrier means and is arranged in a plane parallel to the record carrier on which axle the recording means is rotatably mounted so that its recording point can be lifted off the record carrier against the force of the spring.

Accordingly, it is the aim of the present invention to provide a recording mechanism which will generally avoid and overcome many of the problems which arise in prior devices.

SUMMARY OF THE INVENTION

Briefly, the present invention may be described as a recording device adapted for use with a planar record medium which is driven in a given direction under timed control comprising a lever assembly having stylus means operatively mounted thereon for movement in a direction transverse to said given direction of travel of said record medium to effect recording thereon, axle means extending perpendicularly to the plane of said record medium having said lever assembly mounted thereon for movement relative thereto to effect recording movement of said stylus and to enable said stylus to be lifted from and applied against said record medium, first arm means formed as part of said lever assembly extending radially from said axle means having said stylus means operatively mounted thereon, second arm means extending radially from said axle means adapted to be actuated in accordance with information to be recorded on said recording medium to effect movement of said stylus, a recording spring operatively engaged with said second arm means to apply a spring biasing force thereto counteracting movement of said stylus and means mounting said assembly upon said axle means to enable rotational movement thereof about said means to effect recording movement of said stylus and tilting movement thereof laterally of said axle means to enable said stylus to be lifted from and applied against said recording medium.

The lever assembly is arranged to be mounted upon the axle means at two locations which are axially spaced from each other on the axle means, with said mounting means including a bore having said axle means extending therethrough formed in the lever assembly at one of said space locations and having a diameter generally equivalent to the diameter of the axle means whereby the lever assembly may rotate about the axle means to effect recording movement of the stylus. The mounting assembly also includes a rectangular opening having the axle means extending therethrough formed in the lever assembly at the other of said space locations to permit the lever assembly to be tilted laterally of the axle means thereby permitting the stylus to be lifted from the record medium.

Accordingly, with the present invention the axle means is arranged perpendicular to the plane of the record medium and the recording means is formed with bearing means on the first arm provided with a bore corresponding in diameter to the axle means and with a second arm provided with the longitudinal or rectangular opening, with the recording means being rotatable in a plane normal to the recording plane in counteracting movement to the force of a recording spring, the rotational axis being a stop part axially supporting the recording means which is arranged on the axle bearing the recording means.

In accordance with one embodiment of the invention, the stop means is a washer disc connected to the axle while the recording means is formed as a unitary member. Also, in this embodiment, the spring influences the recording means at such an angle with respect to its rotational plane that one component force produces the recording pressure while another component force secures a non-positive connection between a driving part on the recording means and a driving member which transmits the recording movement to the recording means.

As a result, a solution is provided which involves a minimum of parts and which, with respect to utilization of available space and functional security provides optimum design features and also optimally mounted recording means.

Additionally, in accordance with the present invention, the production and mounting expenses are greatly reduced. Apart from the fact that the recording drive may be transmitted positively or non-positively to the recording means without requiring additional parts, the positive connection has the advantage of requiring the least driving torque while for a non-positive connection the force is transmitted in accordance with a preferred embodiment of the invention in an advantageous manner in that a suitably arranged spring delivers the recording force.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DESCRIPTION OF THE PREFERRED EMBODIMENTS

Figure 1:
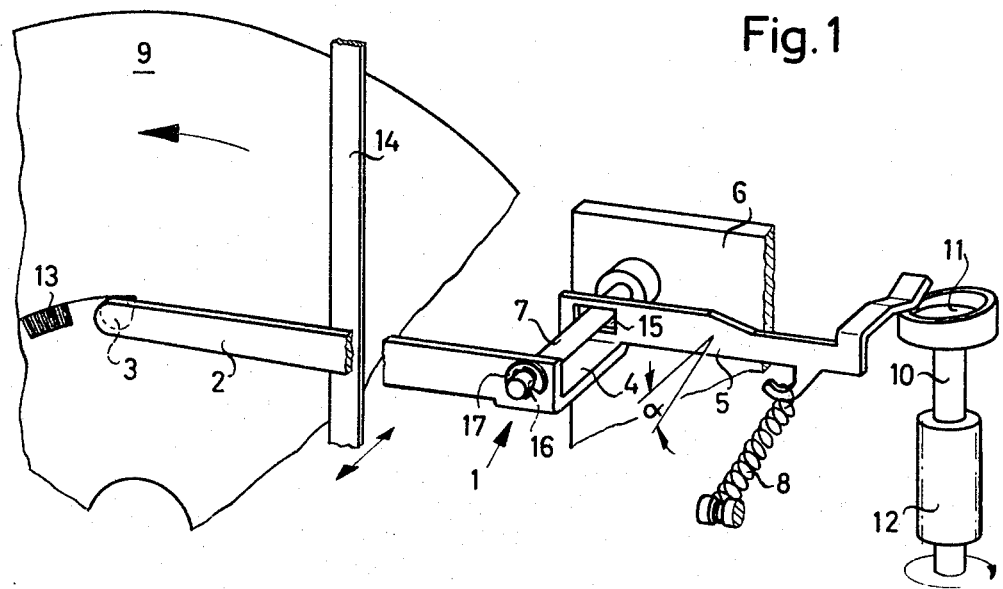
FIG. 1 is a partial perspective view showing the principal parts, partially in section, of an apparatus embodying the present invention.

Referring now in particular to FIG. 1, apparatus in accordance with the present invention is shown as comprising recording means 1 formed essentially as a unitary lever assembly including a first arm 2 having a recording point or stylus 3 thereon, with mounting means in the form of a bracket 4 joining together the first arm 2 and a second arm 5 which operates as a driving lever, the entire unitary or integrally formed lever assembly 1 being mounted on a support axle 7 which is fixedly located at a housing part 6. As will be explained more fully hereinafter, the lever assembly 1, including the first arm 2 and the second arm 5, is mounted on the axle 7 so as to be rotatable thereabout as well as to be axially displaceable thereon.

The apparatus includes a spring 8 and, under the effect of the spring 8, the recording means 1 and its recording point 3 may be brought to bear against a disc or record medium 9 to effect a recording operation thereon. The second arm 5 is in non-positive engagement with cam means 11 provided on a shaft 10. The shaft 10 is in driving connection with a motor (not shown) through a worm 12. In this manner, the recording means or lever assembly 1 is rotated about the axle 7 in order to produce a recording which may, for example, be in the form of a bar diagram 13 on the record medium disc 9.

When the first recording arm 2 is to be lifted off the record medium 9, this may be effected, for example, by a connecting part 14 which will be pivoted when a lid (not shown) on similar part of the apparatus is opened or when the record medium must be exchanged. The exchange of the record medium and the lifting of the stylus 3 and the arm 2 off the record medium 9 is effected by tilting the lever assembly 1 transversely or laterally relative to the axle 7.

The ability to tilt or laterally move the lever assembly 1 relative to the axle 7 is provided by the bearing bracket 4 and by a longitudinal slot or opening 15 formed at the radially inner end of the second arm 5, with the width of the slot 15 corresponding to the diameter of the axle 7, while the length of the slot is somewhat longer than the axle diameter to enable the arm 2 to be moved laterally or transversely of the axis of the axle 7.

The lever assembly is also mounted to the axle 7 at another mounting position wherein a bore 16 in the bearing bracket 4 has the axle 7 extending therethrough, with the bore 16 having a diameter which generally corresponds in diameter to the axle 7, but with the bore being dimensioned so that tolerances between this bore and the outer surface of the axle 7 are sufficient to allow tilting movement of the recording means 1 by tilting of the arm 2 about the end of the axle 7 where the bore 16 is engaged, in the direction of the double-headed arrow shown in FIG. 1. A washer disc 17 arranged at the axle 7 serves as an axially effective stop means for the recording means 1 with respect to the components of a spring 8 delivering the recording pressure. It forms the pivotal or tilting axis with respect to the tilting movement of the recording means 1.

Figure 2:
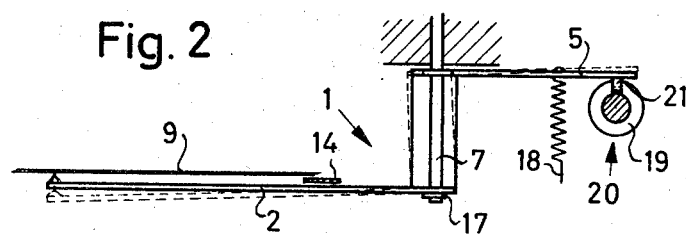
FIG. 2 is a side elevation showing a second embodiment of the invention.
Figure 3:
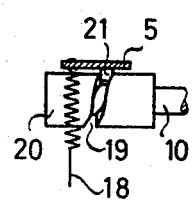
FIG. 3 is a more detailed view of parts of the embodiment of FIG. 2.

From FIGS. 2 and 3 it may be seen that a spiral spring 18 operates to influence the recording means 1. Contrary to the embodiment shown in FIG. 1, wherein the spring 8 acts under an angle $\alpha$ to the pivotal or tilting plane of the recording means 1, spring 18 acts essentially in the pivotal plane and is dimensioned to deliver only the recording force by means of which the recording arm 2 rests on the record carrier or medium. As a driving part, in this embodiment, the shaft 10 is provided with a cam shaped recess 19 provided in a cam part 20. A pin 21 fastened to the recording means 1 at its second driving arm 5 is in engagement with the recess 19 so that, in this way, a positive driving connection is provided.

Figure 4:
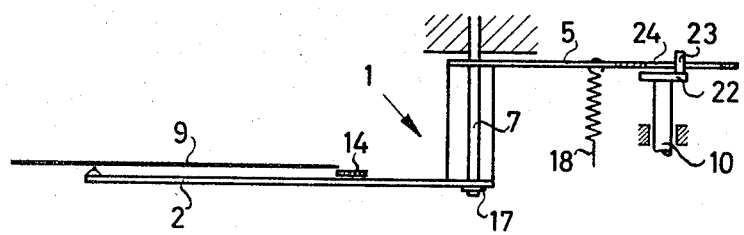
FIG. 4 is a side elevation showing a third embodiment of the invention.

A similar variation is shown in FIG. 4 which also includes a positive driving connection formed with a disc 22 on a shaft 10 having an eccentrically arranged pin 23. This pin engages a slot 24 formed in the driving lever 5 so that a positive connection between the driving element and the recording means is effected.

Naturally other similar arrangements for connecting the recording means to the driving means may be realized. Also, with a corresponding shape of the driving lever it is possible to electromagnetically directly control the recording means.

While specific embodiments of the invention have been shown and described in detail to illustrate the application of the inventive principles, it will be understood that the invention may be embodied otherwise without departing from such principles.

What is claimed is:

1. A recording device adapted for use with a planar record medium which is driven in a given direction under timed control comprising: a lever assembly having stylus means operatively mounted thereon for movement in the direction transverse to the given direction of travel of said record medium to effect recording thereon; axle means extending perpendicularly to the plane of said record medium having said lever assembly mounted thereon for movement relative thereto to effect recording movement of said stylus and to enable said stylus to be lifted from and applied against said record medium; first arm means formed as part of said lever assembly extending radially from said axle means having said stylus means operatively mounted thereon; second arm means extending radially from said axle means adapted to be actuated in accordance with information to be recorded on said record medium to effect movement of said stylus; a recording spring operatively engaged with said second arm means to apply a spring force thereto counteracting movement of said stylus; and means mounting said lever assembly upon said axle to enable rotational movement thereof about said axle to effect recording movement of said stylus and also to enable tilting movement thereof laterally of said axle to enable said stylus to be lifted from and applied against said recording medium.

2. A recording device according to claim 1 wherein said lever assembly is arranged to engage said axle means at two locations thereon which are axially spaced from each other and wherein said mounting means include a bore having said axle means extending therethrough formed in said lever assembly at one of said spaced locations and having a diameter generally equivalent to the diameter of said axle means, and a rectangular opening also having said axle means extending therethrough formed in said lever assembly at the other of said spaced locations.

3. A recording device according to claim 2 wherein said rectangular opening has a width dimension generally equivalent to the diameter of said axle means and a length dimention greater than the diameter of said axle means to a degree sufficient to permit tilting movement of said lever assembly about said one of said spaced locations.

4. A recording device according to claim 1 wherein said first arm means and said second arm means each extend from said axle means, respectively, at different ones of said spaced axial locations.

5. A recording device according to claim 1 further including a washer disc connected to said axle means serving as a stop member.

6. A recording device according to claim 1 wherein said lever assembly is formed as a unitary member.

7. A recording device according to claim 1 wherein said second arm means is arranged to engage a driving member operating to deliver the recording movement to said stylus through said lever assembly, said recording spring acting to apply to said lever assembly a first component spring force operating to effect recording pressure of said stylus against said record medium and a second component spring force which will effect driving connection between said second arm means and said driving member delivering said recording movement to said lever assembly.

8. A recording device according to claim 1 wherein said recording spring is arranged in a plane corresponding to the plane through which said lever assembly moves when rotating about said axle means.

9. A recording device according to claim 1 further comprising a driving mechanism operative to engage said second arm means to impart to said lever assembly a desired actuating force to move said stylus to effect a desired recording on said recording medium.

10. A recording device according to claim 9 wherein said driving mechanism comprises a rotatably driven cam member and wherein said second arm means includes cam follower means engaging said cam member.

11. A recording device according to claim 9 wherein said driving mechanism comprises a driving member having a generally helically extending slot formed therein and wherein said second arm means includes a member engaged within said slot in driving relationship therewith.

12. A recording device according to claim 9 wherein said driving mechanism comprises a rotating disc having a pin eccentrically mounted thereon and wherein said second arm means includes a slot having said eccentric pin drivingly engaged therein.

* * * * *